United States Patent [19]

Suzuki et al.

[11] Patent Number: 5,377,030
[45] Date of Patent: Dec. 27, 1994

[54] METHOD FOR TESTING ACTIVE MATRIX LIQUID CRYSTAL BY MEASURING VOLTAGE DUE TO CHARGE IN A SUPPLEMENTAL CAPACITOR

[75] Inventors: Yoshio Suzuki; Haruhiko Kaneko, both of Kanagawa; Hiroyuki Yoshine, Tokyo; Yuji Hayashi; Toshikazu Maekawa, both of Kanagawa, all of Japan

[73] Assignee: Sony Corporation, Tokyo, Japan

[21] Appl. No.: 37,644

[22] Filed: Mar. 26, 1993

[30] Foreign Application Priority Data

Mar. 30, 1992 [JP] Japan ................... 4-103579
Mar. 30, 1992 [JP] Japan ................... 4-103580

[51] Int. Cl.⁵ ............... G02F 1/1335; G02F 1/1343; G01R 31/02
[52] U.S. Cl. ....................... 359/57; 359/59; 359/55; 359/62; 324/770; 324/71.3
[58] Field of Search .............. 359/62, 54, 55, 56, 359/57, 58, 59; 324/158 R, 158 T, 519, 770, 71.3

[56] References Cited

U.S. PATENT DOCUMENTS

| | | | |
|---|---|---|---|
| 4,940,934 | 7/1990 | Kawaguchi et al. | 324/158 T |
| 5,057,775 | 10/1991 | Hall | 324/73.1 |
| 5,184,082 | 2/1993 | Nelson | 324/158 R |
| 5,231,345 | 7/1993 | Katakura et al. | 324/73.1 |
| 5,243,272 | 9/1993 | Hall et al. | 324/73.1 |
| 5,258,705 | 11/1993 | Okamoto et al. | 359/72 |
| 5,262,720 | 11/1993 | Senn et al. | 324/73.1 |
| 5,268,638 | 12/1993 | Brunner et al. | 324/158 R |
| 5,285,150 | 2/1994 | Henley et al. | 324/73.1 |

Primary Examiner—William L. Sikes
Assistant Examiner—Kenneth Parker
Attorney, Agent, or Firm—Hill, Steadman & Simpson

[57] ABSTRACT

A method for manufacturing an active matrix array substrate having a plurality of pixel drive cells, each pixel drive cell includes a pixel switching element and a capacitor element connected to the pixel switching element in series. The method comprising the inspection steps of storing a charge in the capacitor element and detecting the charge stored in the capacitor element by measuring the voltage and comparing the voltage measured with a reference voltage obtained with a good pixel.

22 Claims, 9 Drawing Sheets

METHOD FOR TESTING ACTIVE MATRIX LIQUID CRYSTAL BY MEASURING VOLTAGE DUE TO CHARGE IN A SUPPLEMENTAL CAPACITOR

BACKGROUND OF THE INVENTION

1. Field of the Invention

The present invention relates to a method for manufacturing an active matrix array substrate and to a method for manufacturing a liquid crystal display using the same, more particularly relates to a method enabling efficient detection of pixel faults during the manufacturing process.

2. Description of the Related Art

Liquid crystal displays (LCDs) may be roughly divided into several types depending on their method of drive. One of the driving methods of an LCD is the active matrix system. In this type of LCD, a switching element and, if necessary, a capacitor element are provided and connected for each pixel at the matrix intersections of gate lines and data lines so as to improve the contrast, response, and other facets of display performance.

The LCD of active matrix system has an active matrix array substrate, on the surface of which substrate are arranged, in a matrix, pixel drive cells each comprised of a switching element for selecting a pixel and a capacitor connected to the switching element in series. Each pixel drive cell is provided with a pixel electrode corresponding to a pixel.

On this active matrix array substrate, a counter substrate is arranged substantially in parallel a predetermined distance away. The counter substrate is comprised, for example, of a glass substrate. On the surface of the counter substrate facing the active matrix array substrate (drive substrate) is laid a transparent counter electrode. Between the counter substrate and the drive substrate a liquid crystal is filled so as to form the liquid crystal layer.

To manufacture such an LCD, the drive substrate and the counter substrate on which the counter electrode is formed as a film are produced separately, assembled together substantially in parallel with a predetermined distance between them, and the space between them in filled with a liquid crystal, whereby a sealed liquid crystal layer is formed.

Not all the LCDs formed in this way, however, will be good ones free of pixel faults, so it is necessary inspect each LCD to determine if it has any pixel faults. The method used to inspect active matrix type LCDs for pixel faults after the liquid crystal is filled is to actually drive the LCD and analyze the image by an image processing device to inspect for faults or to inspect for faults visually. As a method used to inspect active matrix type LCDs for pixel faults after the liquid crystal is filled, there is the method disclosed in Japanese Unexamined Published Patent Application (Kokai) No. 63-123093, for example.

In this method, however, an image is actually displayed on the LCD for the inspection, so the inspection takes a long time and therefore productivity suffers. Further, since this inspection of pixel faults was performed on the LCDs after they were filled with liquid crystal, there was the problem that when a pixel fault was discovered, the LCD having that fault had to be discarded. This is because it is not practical in terms of manufacturing costs etc. to drain the liquid crystal from an LCD once it has been filled, repair the faulty portion or replace the faulty drive substrate, then refill the liquid crystal.

Therefore, a method has been proposed for inspecting for pixels faults of an LCD before the liquid crystal is filled.

The main means for inspecting for pixel faults of an LCD before filling with a liquid crystal are as follows:

First, the method is known of placing direct contact pins on the X and Y rows on the surface of the active matrix array substrate and performing a direct current (DC) test of the drive cells corresponding to the pixels.

In this technique, the DC test is repeatedly performed in the X and Y directions to detect faults in all the pixels. This method has the defects that it requires the same number of direct contact pins as the X, Y pixels and that the time required for the test is long (about one to five minutes). In particular, this technique cannot be used for LCDs including H/V scanners (horizontal and vertical scanning circuits) where the X and Y terminals do not stick out.

Second, there is the method of using a special crystal to detect the pixel faults as the light intensity (one to two minutes required for measurement).

In this method, instead of a liquid crystal, a special sheet-like crystal which changes in index of refraction in accordance with the voltage applied to it is placed on the surface of the active matrix array substrate. Laser light is input on the crystal and the light passing through it or reflected from it is detected so as to catch faults in the pixels. In this method, information detected as light has to be processed again by a camera, so the processing becomes complicated. Further, it is not possible to perform the test in the actual driving state. In addition, there is the problem that the resolution becomes insufficient and detection is not possible if the size of the pixels is less than several tens of microns.

As a third method, there is the method inspecting the LCDs before filling with liquid crystal from above by a camera or linear sensor (three to five minutes required for measurement).

In this method, however, while it is possible to detect physical faults of the pixels, it is not possible to detect electrical faults.

SUMMARY OF THE INVENTION

The present invention was made in consideration of the above state and has as its object the provision of a method for manufacturing an active matrix array substrate such as an active matrix array substrate which enables detection of pixel faults in a comparatively short time and with great accuracy even before the step of filling the liquid crystal, a method for manufacturing a liquid crystal display using this substrate, and inspection method and device for this substrate.

To achieve the above-mentioned objects, the inspection method for an active matrix array substrate the present invention includes a step of storing a certain charge in capacitors provided for pixel drive cells and then detecting the stored charges so as to detect pixel faults.

The charge to be stored in the capacitors may be input from either an image signal input terminal or a common electrode terminal connected to one electrode terminal of the capacitors. The stored charge can be detected from the image signal input terminal or the common electrode terminal.

The method for manufacturing an active matrix array substrate and a liquid crystal display of the present invention has a step of inspecting the active matrix array substrate mentioned above.

In accordance to the method of the present invention, the drive cells comprised of the switching elements and capacitor elements are provided on an active matrix array substrate in a matrix corresponding to the pixels. The drive cells are successively scanned in substantially the same way as the case of, for example, actual driving of the liquid crystal. Therefore, a certain charge is stored in each capacitor element in a field and then each stored charge is successively read in the next field. As a result, if there is a fault in a switching element or capacitor element of a predetermined drive cell corresponding to a pixel or in the signal line connected to the same, information on that fault can be read.

Therefore, in the method of the present invention, it is possible to inspect the active matrix array substrate before the liquid crystal filling step under conditions resembling those of the actual driving state and it is possible to inspect portions which might become pixel faults at a high speed (for example, less than about 5 seconds). Further, the resolution of the inspection depends on the pixel holding capacity of the capacitor elements and does not depend on the size of the pixels, so accurate inspection of each pixel is possible. Further, it is possible to inspect even an active matrix array substrate with a horizontal scanning circuit and vertical scanning circuit integrally assembled. If the inspection is performed using the method of the present invention in synchronization with the horizontal scanning circuit and the vertical scanning circuit, it is possible to accurately inspect the address position of the pixel line suffering from a pixel fault. Still further, it is possible to apply the method of the present invention after filling the liquid crystal.

In an active-matrix thin-film transistor liquid crystal display, it is necessary to add a capacitance in parallel with the liquid crystal so as to hold the applied voltage written through the data line (column line) until the next writing operation. There are two ways to form the capacitance connected in parallel with the liquid crystal: additional type capacitance, where the adjoining gate line (row line) and pixel electrode are made to overlap to form a capacitance, and storage type capacitance, where one electrode of the capacitance is lead out as a separate terminal from the gate line (row line).

Therefore, when the capacitor element connected in series with a transistor is an additional type capacitance, the storage and detection of the charge are done from the image signal input terminal. On the other hand, when the capacitor element connected in series with the transistor is a storage type capacitance, then by going through the common electrode terminal connected to one electrode terminal of the capacitor element, it becomes possible to prevent the effect of the parasitic capacitance from the data line (column line) and to increase the detection level of the charge stored in the capacitor element, so it is possible to raise the precision of detection.

In accordance with the present invention using an amplifier comprised of virtual potential amplifier, there is no fear of a mistaken inspection that a normal switching element during actual driving is deemed to an abnormal switching element during inspection. Namely, it is possible to inspect an active matrix array substrate in the same state as an actual driving of a LCD having the substrate.

BRIEF DESCRIPTION OF THE DRAWINGS

The present invention will be further clarified below with reference to the accompanying drawings, wherein.

DESCRIPTION OF THE PREFERRED EMBODIMENTS

Below, the present invention will be discussed in further detail based on the embodiments shown in the drawings.

First, an explanation will be made of the method for manufacturing a liquid crystal display (LCD) according to a first embodiment of the present invention.

To manufacture an LCD, it is first necessary to manufacture an active matrix array substrate (drive substrate).

Figure 1:
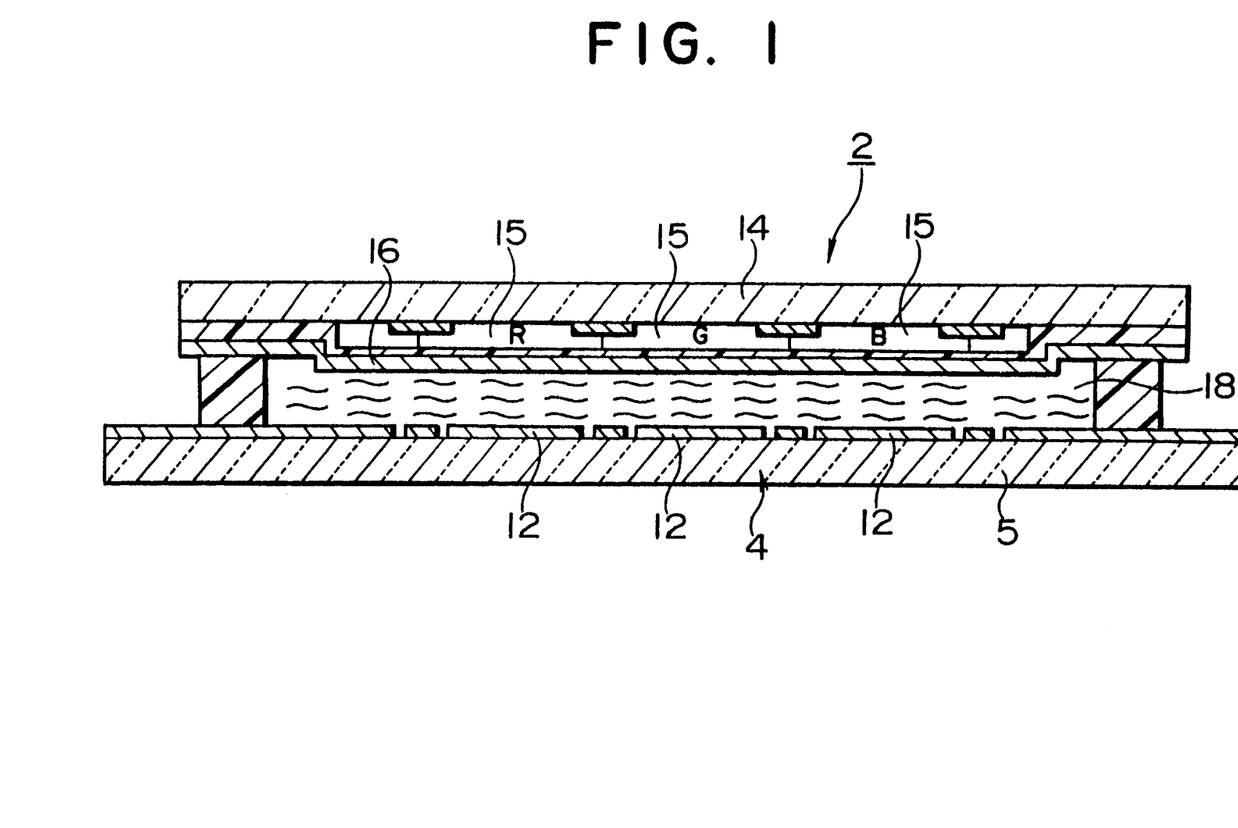
FIG. 1 is a partial schematic sectional view of a liquid crystal display (LCD) having active matrix array substrate.

The active matrix array substrate is not particularly limited, but for example use may be made of the active matrix array substrate 4 shown in FIG. 1. In the following explanation, the active matrix array substrate is used as a liquid crystal drive substrate. The active matrix array substrate, however, may not only be used as the liquid crystal drive substrate, but also may be used as a drive substrate for driving an another type of flat display panel.

In the embodiment shown in FIG. 1, for example, pixel drive cells (not shown) each comprised of a switching element (not shown) and a capacitor element (not shown) connected in series with the switching element are arranged on a transparent substrate 5 made of a glass, for example. The pixel drive cells have pixel electrodes 12 corresponding to the pixels arranged in a matrix. In a TFT (thin-film transistor) type active matrix array substrate, an amorphous silicon film or a polycrystalline silicon film or the like is formed on a glass substrate so as to form TFTs as switching elements and integrated capacitors in a matrix array.

Note that the drive substrate of the invention may not be limited to the TFT type drive substrate, but may be a semiconductor substrate etc. on which the switching elements and the capacitor elements are formed in a matrix.

Figure 2:
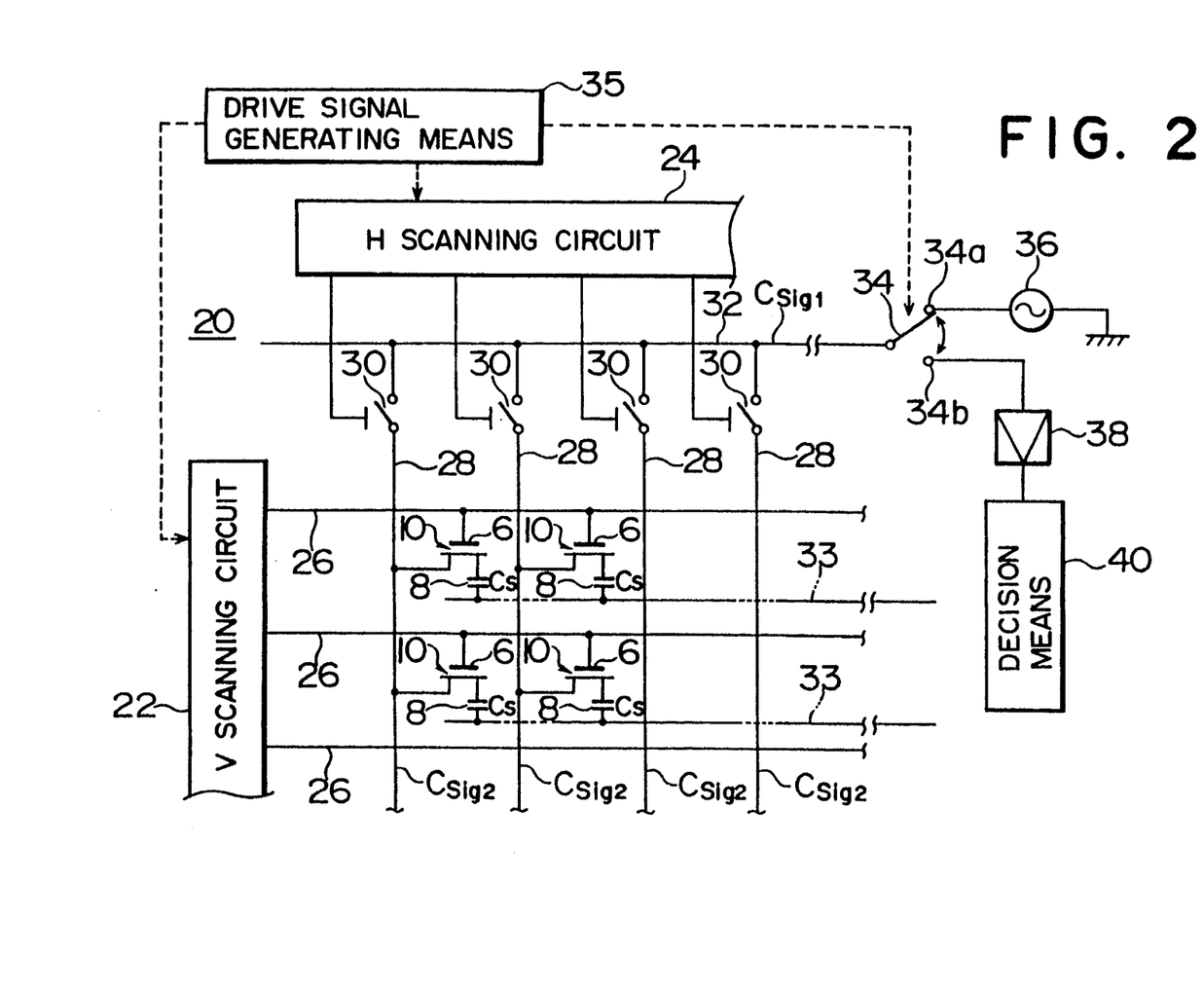
FIG. 2 is a schematic view of the circuit construction in the case of connecting a pixel fault inspection device to a liquid crystal drive circuit of an active matrix array substrate according to a first embodiment of the present invention.

The connections of the drive cells arranged in a matrix are shown in FIG. 2. The drive cells 10 are arranged in a matrix at the intersections of gate lines 26 and data lines 28 to form the liquid crystal drive circuit 20. The gate lines 26 are connected to the vertical scanning circuit 22. Further, the vertical scanning signal lines 28 are connected to a video signal input terminal line 32 through scan switching circuits 30. The scan switching circuits 30 are comprised, for example, of switching-use complementary metal oxide semiconductors (CMOS). The driving of the switches is controlled by the horizontal scanning circuit On the other hand, the capacitor element 8 of the drive cell 10 provided for each pixel is connected in series with the switching element 6. One electrode terminal of the capacitor element 8 is connected to the switching element 6 and the other electrode terminal is connected to the common electrode terminal line 33.

In this embodiment, the vertical scanning circuit 22, the horizontal scanning circuit 24, the switch circuits 30, the video signal input terminal line 32, the common electrode terminal lines 33, the gate lines 26, and the data lines 28 are formed together with the drive cells 10 on the surface of the same active matrix array substrate 4. Note that the horizontal scanning circuit 24 and the vertical scanning circuit 22 may be formed on a different substrate from the active matrix array substrate on which the drive cells 10 are formed in a matrix. Further, in the example shown in FIG. 2, only one video signal input terminal line 32 is formed, but in the case of a color liquid crystal display, three video signal input terminal lines corresponding to RGB are necessary.

Figure 5A:
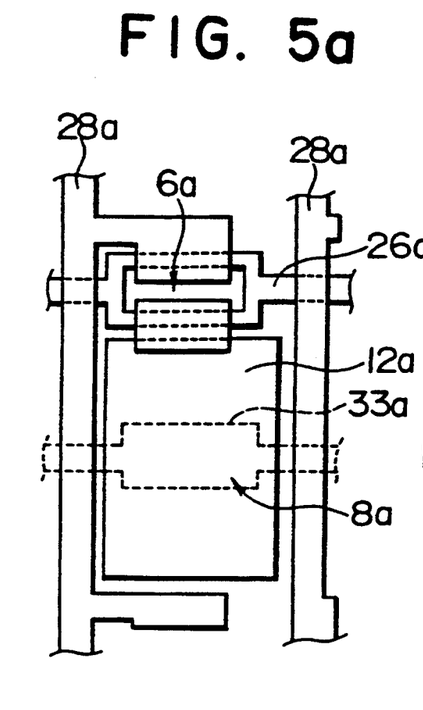
FIG. 5a and 5b are plane views each showing a different type of capacitor element.
Figure 6A:
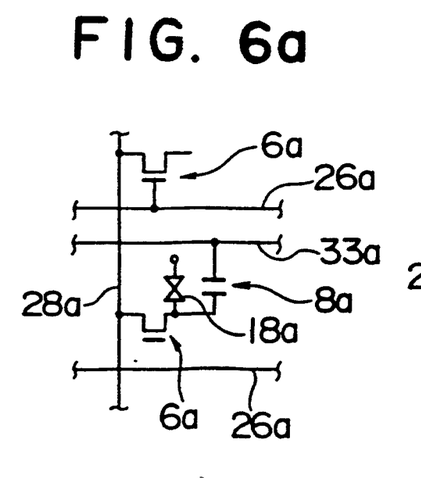
FIGS. 6a and 6b are equivalent circuit diagrams of capacitor elements as shown in FIG. 5a and FIG. 5b respectively.

In the embodiment shown in FIGS. 1 and 2, the switching elements 6 constituting the drive cells 10 are constituted by TFT formed on the transparent substrate 5, while the capacitor elements 8 are formed as storage type capacitor elements 8a as shown in FIGS. 5a and 6a. In the storage type capacitor element 8a, a transparent electrode is used as a common electrode terminal 33a which is integrally formed on an insulator layer over a pixel electrode 12a so as to overlap with the part of the electrode 12a.

Note that in the present invention, the specific construction of the active matrix array substrate is not limited to the embodiment shown in FIG. 1 and may be modified in many ways.

For example, the switching element of the invention may be comprised of either one of MOS FET, MIM element, diode element or varister element.

Figure 5B:
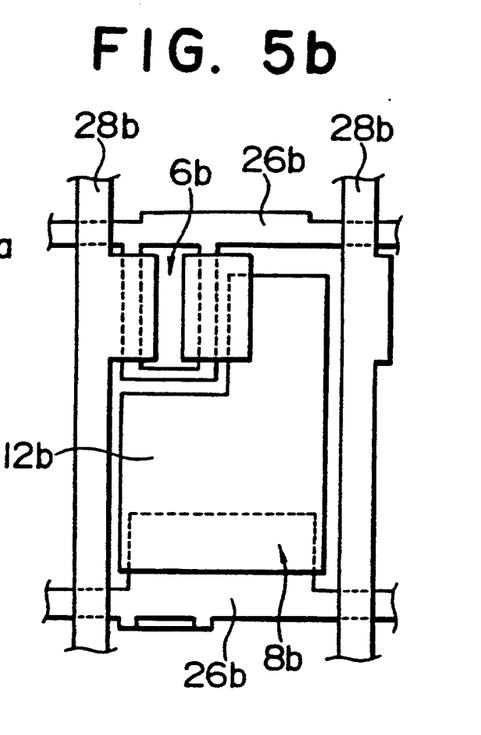
Figure 6B:
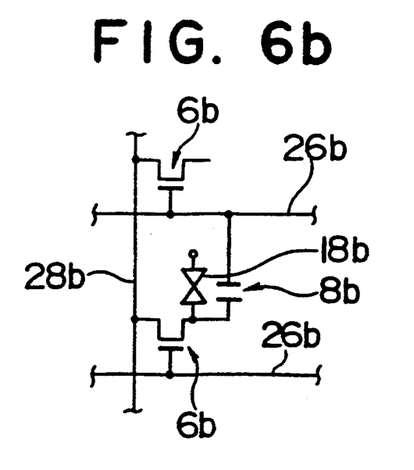

Further, the capacitor element of the invention may not be limited to the storage type capacitor element 8a shown in FIGS. 5a and 6a, but may be a additional type capacitor element 8b shown in FIGS. 5b and 6b. In the additional type capacitor element 8b, a part of a pixel electrode 12b is overlapped with a part of an adjacent gate line 26b and a insulator layer is between the pixel electrode 12b and the gate line 26b. In FIGS. 5a, 5b, 6a and 6b, 26a and 26b designate gate lines, 28a and 28b designate data lines, 6a and 6b designate TFT, 8a and 8b designate capacitor elements and 18a and 18b designate liquid crystal pixels.

When manufacturing an LCD 2 using this active matrix array substrate 4, for example, as shown in FIG. 1, a counter substrate 14 having a counter electrode 16 is disposed substantially parallel to the active matrix array substrate 4 at a predetermined distance from it and liquid crystal is filled in between the two to form the liquid crystal layer 18. The counter substrate 14 is constituted, for example, by a glass substrate. On the surface of the counter substrate 14 facing the drive substrate 4 is laid a transparent counter electrode 16 comprised by, for example, an ITO film. In FIG. 1, numeral 15 designate a color filter.

In the method for manufacturing an LCD according to an embodiment of the present invention, the above-mentioned active matrix array substrate 4 is manufactured, then, before or after assembly with the counter substrate 14, pixel faults are detected using the method shown below.

First, as shown in FIG. 2, an inspection scan switching circuit 34 is connected to the video signal input terminal line 32. One of the switch terminals 34a of the inspection scan switching circuit 34 is connected to an inspection signal writing power source 36. The voltage applied from the writing power source 36 is about the same as the voltage at the time of actually driving the LCD.

Figure 9:
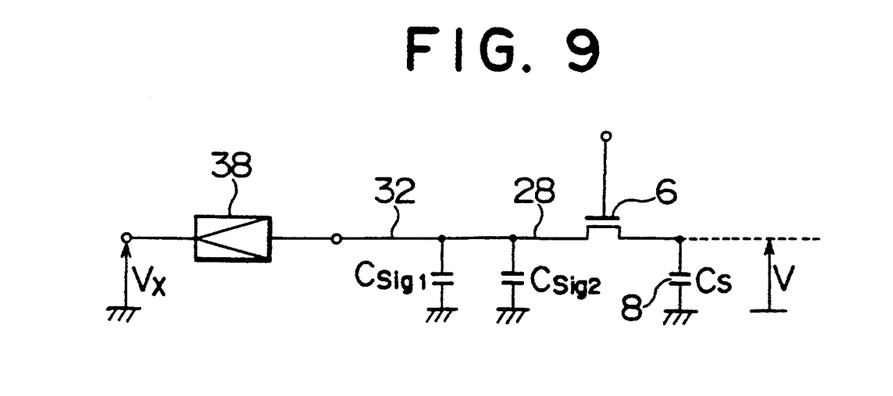
FIG. 9 is an equivalent circuit diagram of the reading of the charge stored in the capacitor element during the substrate inspection step in the first embodiment.

The other switch terminal 34b of the inspection scan switching circuit 34 is connected through a current-voltage conversion (I/V) amplifier 38 to a decision means 40. The decision means 40 is comprised of, for example, an image processing apparatus and analyzes the pixel information input through the inspection scan switching circuit 34 and the I/V amplifier 38. FIG. 9 is an equivalent diagram showing the relationship between the voltage V of the capacitor element during writing and the reading voltage Vx in the case of reading out the charge of the capacitor element 8.

Figure 3A:
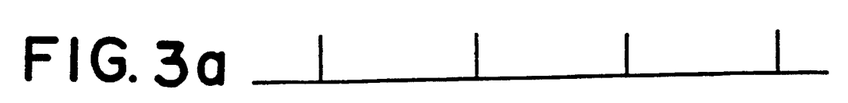
FIGS. 3a, 3b, and 3c are time charts of a scanning drive signal applied to the liquid crystal drive circuit for inspecting the active matrix array substrate.
Figure 3B:
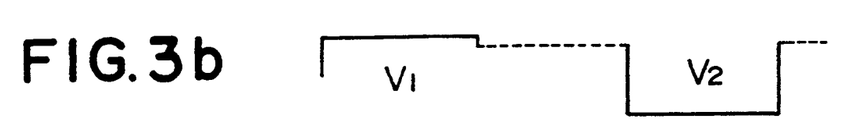
Figure 3C:
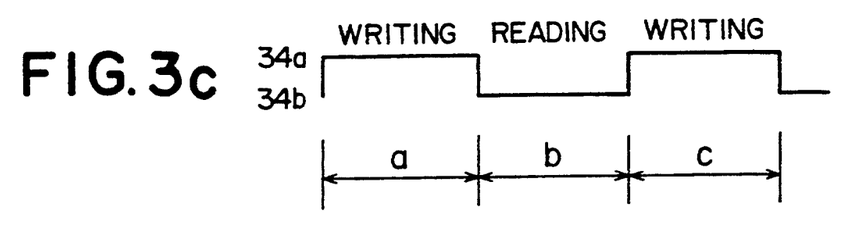

As shown in FIG. 2, the inspection scan switching circuit 34 is constituted so as to switch between connection to the terminal 34a and connection to the terminal 34b at a certain cycle. The cycle of the switching is not particularly limited, but for example the switching may be synchronized with the field signal, one of the video control signals. The field signal, as shown in FIG. 3a, is repeated at a predetermined cycle, so the switching of the inspection scan switching circuit 34, as shown in FIGS. 3b and 3c, is performed by writing an inspection signal by applying a writing voltage V1 in the first one-field period (pattern "a" in the FIGS. 3b and 3c), then reading the inspection signal in the next field period (pattern "b" in the FIGS. 3b and 3c) and repeating the pattern "a" and pattern "b". Note that FIG. 3a is a time chart of the field signal, FIG. 3b is a time chart of the potential of the video signal input terminal line 32, and FIG. 3c is a time chart of the state of switching of the inspection scan switching circuit 34.

The timing for changing the inspection switching circuit 34 is controlled by, for example, a drive signal generating means 35 shown in FIG. 2. The drive signal generating means 35 includes an inspection device and inputs some drive signals to the horizontal scanning circuit 24 and the vertical scanning circuit 22. The drive signals include the field signal shown in FIG. 3a.

When the field signal shown in FIG. 3a is synchronized with and the inspection scan switching circuit 34 is connected to the terminal 34a side, both the horizontal scanning circuit 24 and the vertical scanning circuit 22 are driven synchronously by the field signal, and the drive cells 10 arranged in a matrix are successively scanned during 1 field. At this time, the difference voltage between the voltage V1 from the writing power source 36 and the voltage from the common power source terminal line 33 is applied to the capacitor element 8 of the drive cell 10 and a charge is stored. For example, the voltage V1 may be 12 V, while the voltage from the common power source terminal line 33 may be about 6 V. Accordingly, the difference voltage 6 V may be applied to the capacitor element 8.

When the next field signal comes, the connection of the inspection scan switching circuit 34 is switched to the terminal 34b side. At the same time, the horizontal scanning circuit 24 and the vertical scanning circuit 22 successively start the scanning of drive cells 10 corresponding to 1 field in synchronization with the field signals. As a result, a detection signal corresponding to the charge stored in the capacitor element 8 of the drive cells 10 flows in accordance with the order of the scanning in the video signal input terminal line 32.

When the switching element 6 and the capacitor element 8 of a drive cell 10 are normal, the charge stored in the capacitor element at the previous field period is held almost as it was and is discharged at the time of the reading in the next field period. Therefore, the current arising from the discharge of the charges at the drive cells 10 is successively detected by the decision means 40, whereby the operation of the drive cells 10 is confirmed to be normal. Further, when there is an abnormality in the scan switching circuit 6 or the capacitor element 8 of a predetermined drive cell 10, the discharge current from the abnormal cell circuit 10 is compared with the normal case and it can be seen if there is a fault such as an abnormal reduction of the discharge current.

Figure 4:
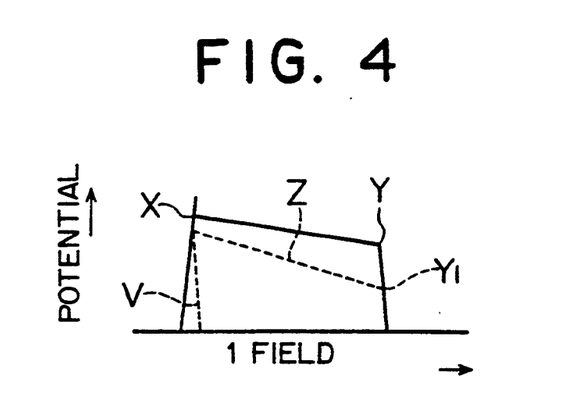
FIG. 4 is a graph showing the method of decision of the pixel fault decision circuit.

For example, as shown by the solid line in FIG. 4, when a cell 10 corresponding to a pixel is normal, in the one-field period from X in the writing operation to Y in the reading operation, the potential across the capacitor element 8 falls somewhat due to natural discharge etc., but substantially remains unchanged. Therefore, the decision means 40 can read the value at the point Y of the charge stored in the capacitor element 8 and can determine if it is normal. If, however, there is an abnormality, for example, in the switching element of the cell circuit, and the leakage current is too large, the path shown by the dotted line Z in the figure is followed during the one-field period. During reading, the potential of the point Y1, much lower than the point Y, is read. Further, when the terminal connection of the capacitor element 8 is incomplete (the capacitor is open) etc., the path shown by the dotted line V in the figure is followed and a charge cannot be stored in the capacitor element.

In an LCD, the brightness of the liquid crystal display screen is affected by the changes in the potential of the capacitor elements 8 during 1 field. Therefore, if the active matrix array substrate before filling with liquid crystal is inspected using a method like in the present embodiment, it is possible to inspect abnormalities which will cause pixel faults after filling with the liquid crystal with a comparatively good precision. In other words, if the inspection is performed using the method of the present invention, results correlated with the level of the faults in the display during actual driving can be obtained.

The following may be illustrated as specific faults which can be determined using the decision means 40 of the present embodiment:

(1) Incomplete terminal connection of the capacitor element 8 (capacitor is open)

In this case, the discharge current cannot be detected at the portion corresponding to the faulty pixel. This is because, as shown by the dotted line V in FIG. 4, a charge cannot be stored in the capacitor element.

(2) Short-circuit of capacitor element 8

In this case, a large discharge current is detected at the portion corresponding to the faulty pixel, compared with the surrounding pixels. This is due to the flow of direct current from the common electrode terminal line 33.

(3) Continual "on" state of switching element 6

In this case, the discharge current falls at the vertical signal line 28 including the faulty pixel. This is because of the effect of the switching element 6 of the cell circuit 10 corresponding to the faulty pixel on the reading of the other cells 10 connected to the same vertical signal line 28.

(4) Continual "off" state of switching element 6

In this case, no discharge current is detected at the portion corresponding to the faulty pixel. Even if the switching element 6 is selected, it will not turn on.

(5) Leakage at capacitor element 8

In this case, the discharge current detected from the portion corresponding to the faulty pixel is detected as low compared with the portion corresponding to the surrounding pixels. As shown by the dotted line Z in FIG. 4, due to the leakage current, the charge storage becomes incomplete.

(6) Disconnection of horizontal signal line 26

In this case, no discharge current is detected from the same horizontal signal line 26.

(7) Disconnection of vertical signal line 28

In this case, no discharge current is detected from the same vertical signal line 28.

Note that it is possible to detect a fault and determine the type of fault by analyzing the pixel voltage detected by the decision means 40 even in the case of other fault modes.

Note also that the present invention is not limited to the above embodiment. Various modifications are possible within the spirit and scope of the present invention.

For example, in the above embodiment, a pixel fault which might occur in the future is detected by using the active matrix array substrate 4 before filling the liquid crystal. Even after the liquid crystal is filled, however, this technique can be applied by making some improvements. The equivalent circuit including the drive circuit after filling of liquid crystal has a capacitance of several percent of the capacitance of the capacitor element 8 as a capacitance component in parallel with the capacitor element, so the equivalent circuit is substantially the same as the circuit shown in FIG. 2. After the liquid crystal is filled, however, if a certain DC voltage is applied to the drive circuit 20, there is a danger of electrolysis occurring. To avoid this, it is sufficient to repeat the cycle of patterns "a", "b", "c", and "b" shown in FIGS. 3b and 3c and repeat synchronously writing and reading operations of the drive cells for each field (pattern). If the writing and reading operations are repeated by the cycle of patterns "a", "b", "c", and "b", the writing voltage V1 of the first writing field and the writing voltage V2 of the next writing field are not the same. By applying a DC voltage of (V1+V2)/2 to the common electrode terminal line 33, an AC voltage will be applied to the liquid crystal and therefore there is no fear of electrolysis of the liquid crystal. Further, by using the pattern "a" and the pattern "c" as writing operation, simultaneous measurement becomes possible under two conditions: the case of applying a potential in the plus direction to the liquid crystal corresponding to the pixel drive cell and the case of applying a potential in the minus direction.

As advantages of using the method of the present invention for inspecting LCDs after filling with liquid crystal, mention may be made of the fact that the fault address can be specified and the fact that a certain extent of evaluation is possible even without viewing an actual display.

The method of the present invention may also be applied to an active matrix array substrate without the horizontal scanning circuit 24 and the vertical scanning circuit 22 incorporated. In this case, a circuit for successively driving the drive cells 10 is attached to the substrate so as to enable use of the method of the present invention.

In the case of this embodiment, there is the advantage of the ability to measure in real time as compared with the conventional method of placing direct contact pins on the X and Y rows and performing a DC test on the drive cells corresponding to the pixels.

Further, in the above embodiment, a writing operation and a reading operation were repeated in each one-field cycle, but this cycle may be changed in the present invention. By changing the cycle, it becomes possible to read out the charge information stored in a capacitor element after an arbitrary time passes. It is also possible to use this for more sophisticated analysis of defects.

Specifically, the cycle may be changed from the one-pixel cycle (0.0 nS units) to a 1H cycle or a multiple-field cycle by temporarily stopping the vertical scanning circuit 22.

Further, in the above embodiment, a potential for causing a charge to be stored in a capacitor element 8 was applied from the video signal input terminal line 32, but the invention is not limited to this. It is also possible to apply the charge storage potential from the common electrode terminal line 33.

Figure 7:
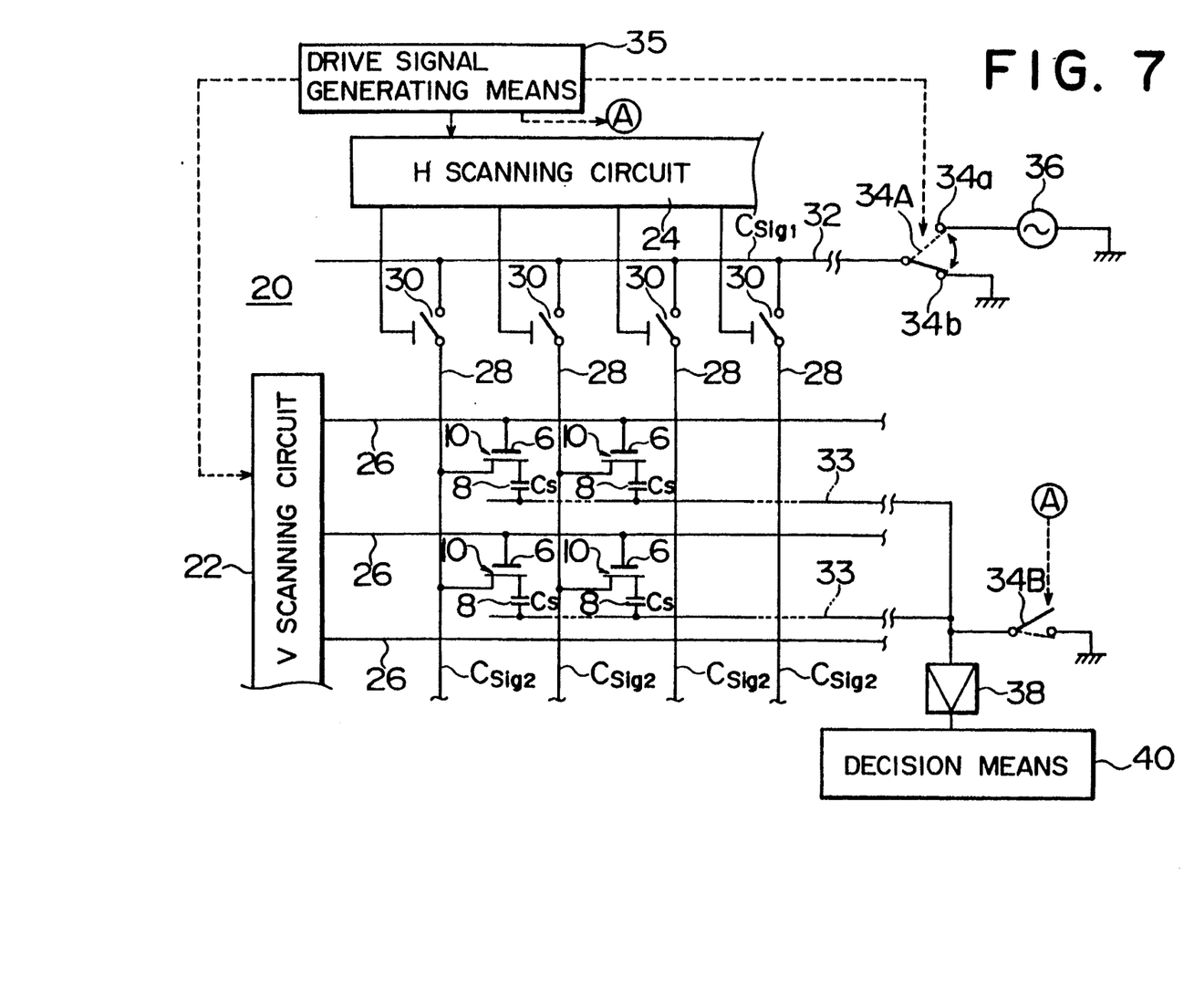
FIG. 7 is a view of the circuit construction in the case of connection of a pixel fault inspection device to a liquid crystal drive circuit of a substrate according to a second embodiment of the present invention.

FIG. 7 shows the circuit construction in the case of connection of a pixel fault inspection device to an active matrix array substrate according to a second embodiment of the present invention.

In the following description and Figures, the same members or components as described in the first embodiment of the present invention are designated by the same numerals and the detailed description will be partially abbreviated.

The connections of the drive cells 10 arranged in a matrix are similar to those as in the first embodiment.

The method of detection of the pixel faults according to the present embodiment is as follows.

First, as shown in FIG. 7, the inspection scan switching circuit 34A is connected to the video signal input terminal line 32. One of the switch terminals 34a of the inspection scan switching circuit 34A is connected to the inspection signal writing power source 36. The voltage applied from the writing power source 36 is about the same as the voltage at the time of actually driving the LCD. The other scan switching circuit 34b of the inspection scan switching circuit 34A is connected to the reference voltage.

The scan switching circuit 34A operates in synchronization with the inspection scan switching circuit 34B connected to a common electrode terminal line 33. The common electrode terminal line 33 has connected to it a decision means 40 through an I/V amplifier 38. The decision means 40 is constituted by, for example, an image processing apparatus and analyzes the pixel information input through the I/V amplifier 38.

The inspection scan switching circuit 34A is constituted so as to switch between connection to the terminal 34a and connection to the terminal 34b at a predetermined cycle. Further, in synchronization with the operation of the inspection scan switching circuit 34A, the inspection scan switching circuit 34B switches between the case of connection to the reference voltage and the case of opening the connection to the reference voltage. That is, a charge is successively stored in the capacitor elements 8 from the inspection signal writing power source 36 through the video input terminal line 32 and data lines 28. When wiring the inspection signal, the scan switching circuit 34B is connected to the reference voltage and the potential is not read out by the decision means 40. Further, when the scan switching circuit 34A is switched to connect to the switching terminal 34b, the scan switching circuit 34B becomes open and the charge stored in the capacitor elements 8 is successively read out, the discharge current is converted to voltage, and the result is monitored by the decision means 40.

The cycle of switching is not particularly limited, but, for example, the switching may be synchronized with the field signal, one of the video control signals. The field signal, as shown in FIG. 3a, is repeated at a predetermined cycle, so the switching of the inspection scan switching circuit 34, as shown in FIGS. 3b and 3c, is performed by writing an inspection signal by applying a writing voltage V1 in the first one-field period (pattern "a" in the figure), then reading the inspection signal in the next field period (pattern "b" in the figure) and repeating the pattern "a" and pattern "b". Note that FIG. 3a is a time chart of the field signal, FIG. 3b is a time chart of the potential of the video signal input terminal line 32, and FIG. 3c is a time chart of the state of switching of the inspection scan switching circuit 34.

The timing for changing the inspection switching circuits 34A and 34B are controlled by, for example, a drive signal generating means 35 shown in FIG. 7. The drive signal generating means 35 is included by a inspection device and input some drive signals to the horizontal scanning circuit 24 and the vertical scanning circuit 22. The drive signals include the field signal shown in FIG. 3a.

When the inspection scan switching circuit 34A is connected to the terminal 34a side in synchronization with the field signal shown in FIG. 3a, both the horizontal scanning circuit 24 and the vertical scanning circuit 22 are driven in synchronization with the field signal, and the drive cells 10 arranged in a matrix are successively scanned during one field. At this time, the difference voltage between the voltage V1 from the writing power source 36 and the voltage from the common power source terminal line 33 is applied to the capacitor element 8 of the drive cell 10 and a charge is stored. For example, the voltage V1 may be 12 V, while the voltage from the common power source terminal line 33 may be about 6 V. The difference voltage of 6 V is applied to the capacitor element 8.

When the next field signal comes, the connection of the inspection switch circuit 34A is switched to the terminal 34b side and the inspection switch circuit 34B becomes open. At the same time, the horizontal scanning circuit 24 and the vertical scanning circuit 22 successively start the scanning of drive cells 10 during one field in synchronization with the field signal. As a result, a detection signal corresponding to the charge stored in the capacitor element 8 of the drive cells 10 flows in accordance with the order of the scanning in the common electrode terminal line 32.

When the switching element 6 and the capacitor element 8 of the drive cell 10 are normal, the charge stored in the capacitor element at the previous field period is held almost as it was and is discharged at the time of the reading in the next field period. Therefore, the current arising from the discharge of the charge at the drive cell 10 is converted to voltage by the amplifier 38 and successively detected by the decision means 40, whereby the operation of the drive cell 10 is confirmed to be normal. Further, when there is an abnormality in the scan switching circuit 6 or the capacitor element 8 of a predetermined drive cell 10, the discharge current from the abnormal cell circuit 10 is compared with the normal case and it can be seen if there is a fault such as an abnormal reduction of the same.

For example, as shown by the solid line in FIG. 4, when the cell circuit 10 corresponding to the pixel is normal, in the one-field period from X during the writing operation to Y during the reading operation, the potential across the capacitor element 8 falls somewhat due to natural discharge etc., but substantially remains unchanged. Therefore, the decision means 40 reads the value at the point Y of the charge stored in the capacitor element 8 and can determine if it is normal. If, however, there is an abnormality, for example, in the switching element of the cell circuit, and the leakage current is too large, the path shown by the dotted line Z in the figure is followed during the one-field period. During reading, the potential of the point Y1, much lower than the point Y, is read. Further, when the terminal connection of the capacitor element 8 is incomplete (the capacitor is open) etc., the path shown by the dotted line V in the figure is followed and a charge cannot be stored in the capacitor element.

In an LCD, the brightness of the liquid crystal display screen is affected by the changes in the potential at the one field's worth of capacitor elements 8. Therefore, if the active matrix array substrate before filling with liquid crystal is inspected using a method like in the present embodiment, it is possible to inspect abnormalities which will cause pixel faults after filling with the liquid crystal with a comparatively good precision. In other words, if the inspection is performed using the method of the present invention, results correlated with the level of the faults in the display during actual driving can be obtained.

The following may be illustrated as specific faults which can be determined using the decision means 40 of the present embodiment:

(1) Incomplete terminal connection of the capacitor element 8 (capacitor is open)

In this case, the discharge current cannot be detected at the portion corresponding to the faulty pixel. This is because, as shown by the dotted line V in FIG. 4, a charge cannot be stored in the capacitor element.

(2) Short-circuit of capacitor element 8

In this case, a large discharge current is detected at the portion corresponding to the faulty pixel, compared with the surrounding pixels. This is due to the flow of direct current from the common electrode terminal line 33.

(3) Continual "on" state of switching element 6

In this case, the discharge current falls at the vertical signal line 28 including the faulty pixel. This is because of the effect of the switching element 6 of the cell circuit 10 corresponding to the faulty pixel on the reading of the other cell circuits 10 connected to the same vertical signal line 28. 6

(4) Continual "off" state of switching element

In this case, no discharge current is detected at the portion corresponding to the faulty pixel. Even if the switching element 6 is selected, it will not turn on.

(5) Leakage at capacitor element 8

In this case, the discharge current detected from the portion corresponding to the faulty pixel is detected low compared with the portion corresponding to the surrounding pixels. As shown by the dotted line Z in FIG. 4, due to the leakage current, the charge storage becomes incomplete.

(6) Disconnection of horizontal signal line 26

In this case, no discharge current is detected from the same horizontal signal line 26.

(7) Disconnection of vertical signal line 28

In this case, no discharge current is detected from the same vertical signal line 28.

In this embodiment, it is possible to detect faults and determine the type of fault by analyzing the pixel voltage detected by the decision means 40 even in the case of other fault modes.

Especially in this embodiment shown in FIG. 7, in comparison with the first embodiment shown in FIG. 2, there are some advantages shown below.

Figure 8:
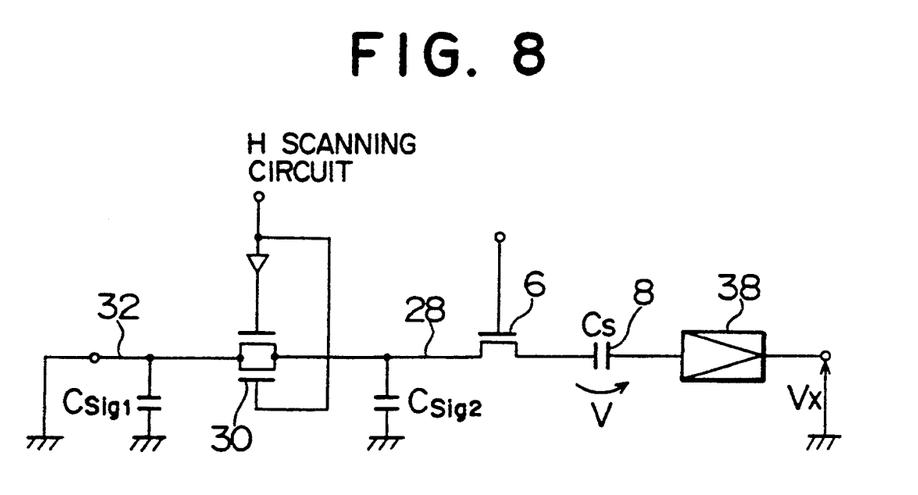
FIG. 8 is an equivalent circuit diagram of the reading of the charge stored in the capacitor element during the substrate inspection step in the second embodiment.

Namely, in this embodiment, reading operation of charges of the capacitor element is performed through the common electrode terminal lines 33. Therefore, an equivalent diagram showing the relationship between the voltage V of the capacitor element during writing and the reading voltage Vx in the case of reading out the charge of the capacitor element 8 is shown in FIG. 8.

On the other hand, FIG. 9 is an equivalent diagram showing the relationship between the voltage V of the capacitor element during writing and the reading voltage Vx in the case of reading out the charge of the capacitor element 8 in the circuit construction of the embodiment shown in FIG. 2. In FIG. 8 and FIG. 9, Cs is the capacity of the capacitor element 8, $C_{sig1}$ is the parasitic capacitance of the video signal input terminal line 32, and $C_{sig2}$ is the parasitic capacitance of the vertical signal line 28.

If the relationship between the voltage V of the capacitor element and the reading voltage Vx is found based on the equivalent diagram shown in FIG. 9 and with the charge of $Q = Cs \times V$ stored in the capacitor element, the result is the following equation 1. As opposed to this, if the relationship between the voltage V of the capacitor element during writing in the second embodiment and the reading voltage Vx is founded based on FIG. 8, the following equation 2 is obtained:

$$Q = C_s V = (C_{sig1} + C_{sig2} + C_s) \times Vx \therefore Vx = C_s/-C_{sig1} + C_{sig2} + C_s \times V \quad (1)$$

$$Q = C_s V = C_s C_{sig2}/C_{sig2} \times Vx \therefore Vx = (C_s C_{sig2} + 1) \times V \quad (2)$$

A comparison of the equations 1 and 2 shows that the reading voltage Vx in equation 2 becomes larger than the reading voltage Vx in equation 1. That is, compared with the first embodiment shown in FIG. 2, according to the second embodiment shown in FIG. 7, it is possible to obtain a large reading voltage Vx (that is, detection level). For example, when $C_{sig1}$ is 4 pF, $C_{sig2}$ is 20 pF, and $C_s$ is 150 pF, the detection level Vx founded by equation 1 becomes about $0.006 \times V$, while the detection level Vx found by equation 2 shown in the embodiment becomes about $0.03 \times V$, showing a large improvement in the detection level. If the detection level is improved, the precision of detection of a pixel fault by the decision means 40 and the decision of the type of fault is improved.

Figure 10:
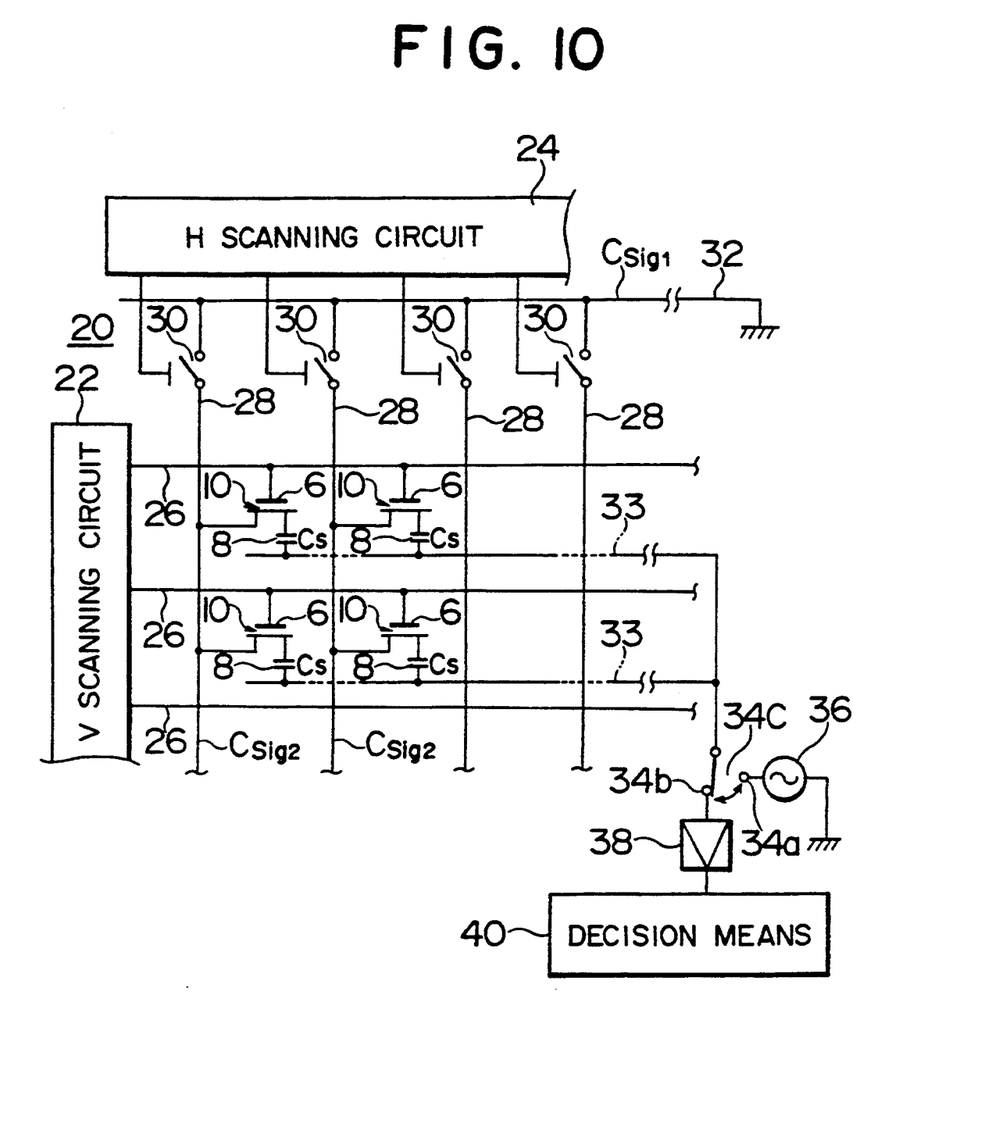
FIG. 10 is a view of the circuit construction in the case of connection of a pixel fault inspection device to a liquid crystal drive circuit of a substrate according to a third embodiment.

FIG. 10 is a circuit diagram showing a method of detection of pixel faults according to a third embodiment. In the embodiment shown in FIG. 10, a video signal input terminal line 32 is continuously grounded to the reference potential, an inspection scan switching circuit 34C is provided to the common electrode terminal line 33, the switching terminal 34a is connected to the inspection signal writing power source 36, while the switch terminal 34b is connected through the I/V amplifier 38 to the decision means 40.

In the above embodiment, the pixel fault which might occur in the future is detected by using the active matrix array substrate 4 before filling the liquid crystal. Even after the liquid crystal is filled, however, this technique can be applied by making some improvements. In the equivalent circuit including the drive circuit after filling of liquid crystal, a capacity of several percent of the capacity of the capacitor element 8 as a capacitance component in parallel with the capacitor element 8 is added since the liquid crystal of each pixel corresponds to a capacitor. Therefore, the equivalent circuit is substantially the same as the circuit shown in FIG. 7, but after the liquid crystal is filled, if a certain DC voltage is applied to the drive circuit 20, there is a danger of electrolysis occurring. To avoid this, it is sufficient to repeat the writing and reading operation of the drive cells for each field by the cycle of patterns "a", "b", "c", and b shown in FIG. 3c. If the writing and reading operations are repeated by the cycle of patterns "a", "b", "c", and "b", since the writing voltage V1 of the first writing field and the writing voltage V2 of the next writing field are not the same, by applying a DC voltage of (V1+V2)/2 to the common electrode terminal line 33, an AC voltage will be applied to the liquid crystal and therefore there is no fear of electrolysis of the liquid crystal. Further, by the pattern "a" and the pattern "c", simultaneous measurement becomes possible under two conditions: the case of applying a potential in the plus direction to the liquid crystal corresponding to the pixel and the drive cell and the case of applying a potential in the minus direction.

As advantages of using the method of the present invention for inspecting LCDs after filling with liquid crystal, mention may be made of the fact that the fault address can be specified and the fact that a certain extent of evaluation is possible even without viewing an actual display.

The method of the present invention may also be applied to an active matrix array substrate without the horizontal scanning circuit 24 and the vertical scanning circuit 22 incorporated. In this case, a circuit for successively driving the drive cells 10 is attached to the substrate so as to enable use of the method of the present invention. In the case of this embodiment, there is the advantage of the ability to measure in real time as compared with the conventional method of placing direct contact pins on the X and Y rows and performing a DC test on the drive cells corresponding to the pixels.

Further, in the above embodiment, a writing operation and a reading operation were repeated in a one-field cycle, but this cycle may be changed in the present invention. By changing the cycle, it becomes possible to read out the charge information stored in the capacitor element after an arbitrary time passes. It is also possible to use this for more sophisticated analysis of defects.

Specifically, it is possible to change the cycle from a one-pixel cycle (0.0 ns units) to a 1H cycle or a multiple-field cycle.

Figure 11:
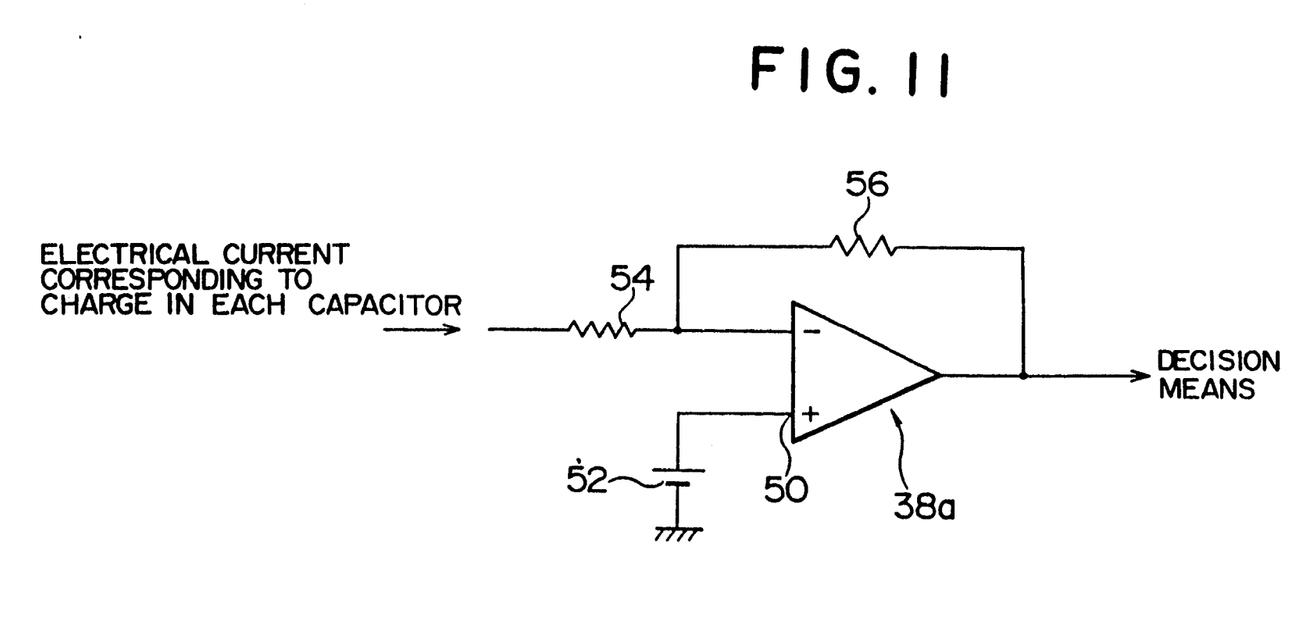
FIG. 11 is a circuit diagram showing an I/V amplifier used in an another embodiment of the invention.

A preferred another embodiment of the present invention will be described below. In this embodiment, instead of using the usual I/V amplifier 38 which is in the state of virtual short and virtual ground, an I/V amplifier 38a shown in FIG. 11 is used.

The I/V amplifier 38a is in the state of virtual short, but is not in the state of virtual ground. The ground side terminal 50 of the I/V amplifier 38a is not connected directly to the ground, but is connected to a constant voltage source 52. The amplifier 38a may be called a virtual potential amplifier hereinafter. On the other hand, the usual amplifier 38 may be called a virtual ground amplifier. The voltage of the constant voltage source 52 is not limited, however, from +0.5 to +11 V, preferably 6 V which is the same voltage as the voltage applied in the common electrode terminal line 33 during actual driving. In FIG. 11, numerals 54 and 56 designate resistors to obtain an amplification gain.

In the first to the third embodiment, the virtual ground amplifier is used as I/V amplifier 38. However, the following problem by using the virtual ground amplifier has been discovered by the inventors.

Figure 12A:
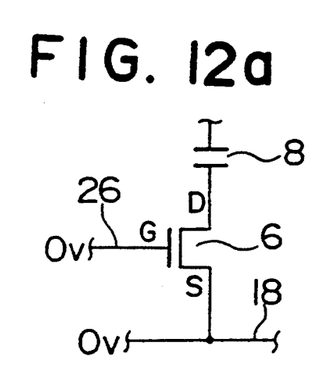
FIG. 12a and 12b are circuit diagrams showing voltage states of transistors which is not scanned at the one time during inspection and actual driving respectively.
Figure 12B:
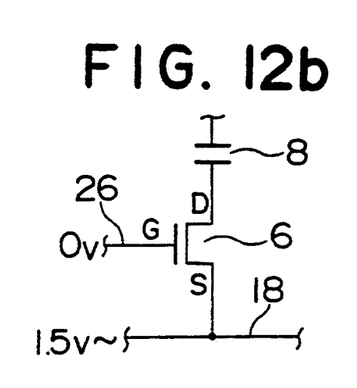
Figure 13:
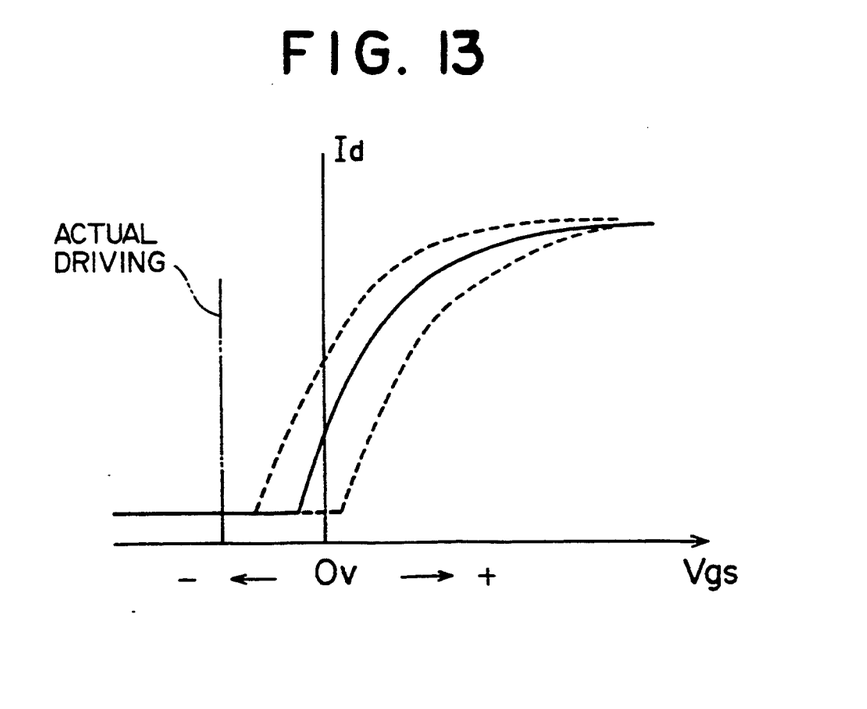
FIG. 13 is a graph showing the characteristics of transistors as switching elements used in the embodiments.

As shown in FIG. 12a, the voltage of the virtual ground (0 V) is applied to source terminal of each switching element 6 which is not scanned at a time. At the same time, the voltage of the gate line 26 is 0 V and therefore switching element 6 is not actuated if the element 6 is normal. However, in the switching element 6 comprised of TFT for example, as showing FIG. 13, current Id flowing to drain terminal "D" of the switching element 6 may not be always 0 V, even if the difference voltage $V_{gs}$ between the voltages of the gate terminal "G" and the source terminal "S" is 0 V. That means that the switching element 6 can not be in an OFF state. A characteristic curve of Id against $V_{gs}$ tends to fluctuate to a plus side or a minus side of $V_{gs}$ because of production error, etc.

When a LCD is driven in an actual drive state, a voltage of 1.5 to 10.5 V is always applied to the video input terminal line 32 and a voltage beyond 1.5 V is always applied to the source terminal of a transistor as the switching element 6. Therefore, the $V_{gs}$ of a transistor which is not scanned at a time during actual driving is below minus 1.5 V and the current Id is not flowed (OFF state) in the transistor which is not scanned, provided that the production error of the transistor is within the allowable rage.

During inspection, however, the voltage $V_{gs}$ of the transistor (switching element 6) which is not scanned is made to go completely to 0 V, because the I/V amplifier is comprised of a virtual ground amplifier. Therefore, there is a fear of leakage current (OFF state of the transistor), even if the transistor is produced within the allowable range of production error. In another words, there is a fear that the normal transistor which can be normally actuated during actual driving is mistaken to be an abnormal transistor during inspection. This fear will occur, even if the switching element is a element other than a transistor.

In accordance with the embodiment using the I/V amplifier 38a shown is FIG. 11, a voltage, which prevents an actuation of a transistor in the same way as during actual driving, is applied to the transistor, because the I/V amplifier 38a is comprised of a virtual potential amplifier. Therefore, there is no fear of a mistaken inspection that a normal switching element during actual driving is deemed to an abnormal switching element during inspection. Namely, it is possible to inspect an active matrix array substrate in the same state as an actual driving of LCD having the substrate.

Further, as a modification of this embodiment, the virtual potential from the constant voltage source may be variably. In this case, it becomes possible to inspect another type of an active matrix array substrate of a LCD having a different driving voltage region. Further, the virtual potential may be designed to be higher or lower by 2 to 3 V than a potential of the common electrode terminal line 33. As a result, a difference potential actuating to the capacitor elements 8 becomes larger and a inspection sensitivity will be improved.

While different embodiments of the present invention have been disclosed, it will be apparent to those skilled in the art that variations and modifications may be made therein without departing from the spirit and the scope of the invention as claimed.

What is claimed is:

1. A method of testing an active matrix array substrate having a plurality of pixel drive cells, each pixel drive cell comprising a pixel switching element and a capacitor element connected to the pixel switching element in series, said method comprising the steps of:
storing a charge in the capacitor element and
individually detecting the voltage of the charge stored in each of said capacitor elements with a decision means which detects pixels faults by comparing the detected voltage with a reference voltage which is obtained with a good pixel.

2. The method as claimed in claim 1, wherein said charge is stored in the capacitor element from an image signal input terminal line connected to data lines through which image data signals are sent to said drive cells.

3. The method as claimed in claim 1, wherein said charge is stored in the capacitor element from a common electrode terminal line connected to an electrode terminal of said capacitor element.

4. The method as claimed in claim 1, wherein said voltage stored in the capacitor element is detected from an image signal input terminal line connected to data lines through which image data signals are sent to said drive cells.

5. The method as claimed in claim 1, wherein said voltage stored in the capacitor element is detected from a common electrode terminal line connected to an electrode terminal of said capacitor element.

6. The method as claimed in claim 1, wherein said switching element is a thin film transistor.

7. The method as claimed in claim 1, wherein a common electrode terminal line is connected to an electrode terminal of the capacitor element and is formed on the substrate.

8. The method as claimed in claim 1, wherein said capacitor element is comprised of an additional type capacitor of which electrode terminal is a part of a gate line.

9. The method as claimed in claim 1, wherein said capacitor element is comprised of an storage type capacitor of which an electrode terminal is formed on the substrate.

10. The method as claimed in claim 1, wherein said substrate includes gate lines and data lines for driving the pixel drive cells, horizontal and vertical scanning drivers, an image signal input terminal line for supplying an image signal to the data lines through a switching element associated with the horizontal scanning driver.

11. A method for testing a liquid crystal display device comprising an active matrix array substrate including a plurality of pixel drive cells arranged at intersections between gate lines and data lines, a horizontal scanning driver associated with the data lines, a vertical scanning driver associated with the gate lines, and an image signal input terminal line for supplying image signals to the data lines through switching elements each pixel drive cell having a switching transistor and a capacitor element associated with the switching transistor,
a counter substrate disposed substantially in parallel to the active matrix array substrate, and
a liquid crystal layer held between said active matrix array substrate and said counter substrate,
said method comprising the steps of:
storing a charge in each of said capacitor elements and individually detecting voltage of the charge stored in each of said capacitor elements with a decision means which detects pixel faults by comparing the detected voltage which is obtained with a reference voltage which is obtained with a good pixel.

12. A method for testing a liquid crystal display device comprising an active matrix array substrate including a plurality of pixel drive cells arranged at intersections between gate lines and data lines, a horizontal scanning driver associated with the data lines, a vertical scanning driver associated with the gate lines, an image signal input terminal line for supplying image signals to the data lines through switching elements, and a common electrode terminal line, each pixel drive cell having a switching transistor and a capacitor element connected between the switching transistor and the common electrode terminal line,
a counter substrate disposed substantially in parallel to the active matrix array substrate, and
a liquid crystal layer held between said active matrix array substrate and said counter substrate,
said method comprising the steps of:
storing a charge in each capacitor element and individually detecting the voltage of the charge stored in each of said capacitor elements through said common electrode terminal line with a decision means which detects pixel faults by comparing the detected voltage with a reference voltage that would be obtained with a good pixel.

13. A method for testing an active matrix array substrate having a plurality of pixel drive cells, each pixel drive cell comprising a pixel switching element and a capacitor element connected to the pixel switching element in series, said method comprising the steps of:
storing a charge in the capacitor element and
individually detecting voltage of the charge stored in each of the capacitor elements with a decision means which detects pixel faults by comparing the detected voltage with a reference voltage that would be obtained from a good pixel.

14. The method as claimed in claim 13, wherein said charge is stored in the capacitor element from an image signal input terminal line connected to data lines through which image data signals are sent to said drive cells.

15. The method as claimed in claim 13, wherein said charge is stored in the capacitor element from a common electrode terminal line connected to an electrode terminal of said capacitor element.

16. The method as claimed in claim 13, wherein said voltage stored in the capacitor element is detected from an image signal input terminal line connected to data lines through which image data signals are sent to said drive cells.

17. The method as claimed in claim 13, wherein said voltage stored in the capacitor element is detected from a common electrode terminal line connected to an electrode terminal of said capacitor element.

18. The method as claimed in claim 13, wherein a amplifier which is in a state of a virtually short is connected to either one of a common electrode terminal line and an image signal input terminal line for inspection and a constant voltage is supplied to a ground side terminal of said amplifier.

19. The method as claimed in claim 18, wherein said constant voltage is within a range from 0.5 to 11 V.

20. A device for testing an active matrix array substrate having a plurality of pixel drive cells, each pixel drive cell comprising a pixel switching element and a capacitor element connected to the pixel switching element in series, comprising:
a driving signal generating means for supplying drive signals to drive said pixel drive cells successively;
a writing means for storing a charge in the capacitor element in synchronization with the driving signals; and
a decision means for individually detecting the voltage of the charge stored in each of the capacitor elements in synchronization with the driving signals and which detects pixel faults by comparing the detected voltages with a reference voltage that would be detected from a good pixel.

21. The device as claimed in claim 20, further comprising a virtual short and a constant voltage source supplying a constant voltage to a ground side terminal of an amplifier.

22. The device as claimed in claim 21, wherein said constant voltage is within a range from 0.5 to 11 V.

* * * * *